Aug. 26, 1941.   N. TESTI   2,253,737
SHAVING IMPLEMENT
Filed Aug. 23, 1937   2 Sheets—Sheet 1
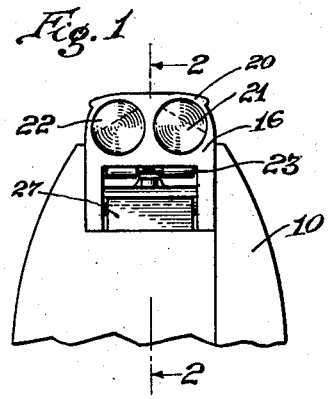
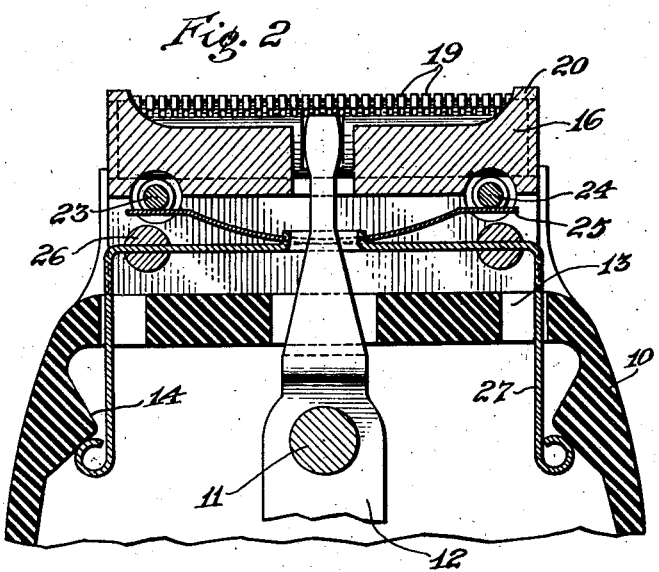
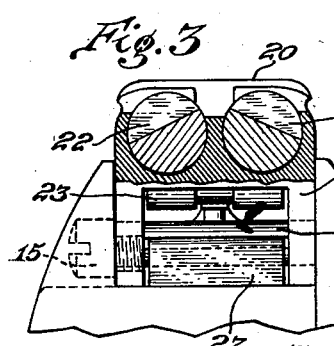
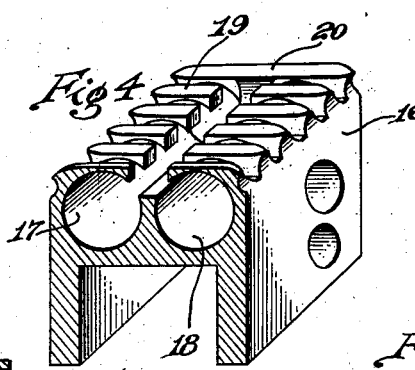
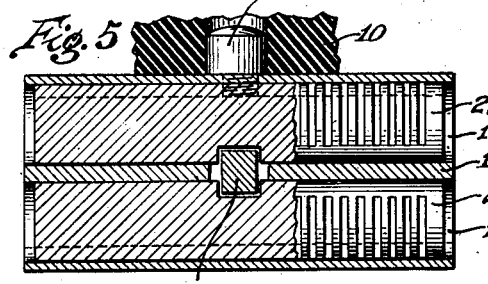
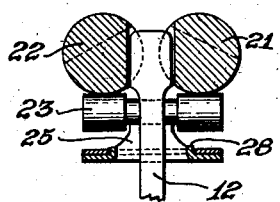
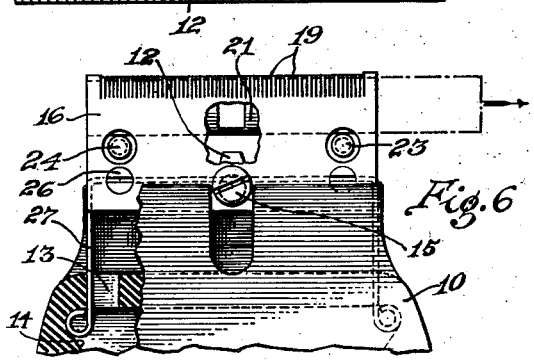
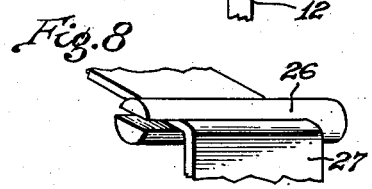
INVENTOR
*Nicholas Testi*
BY *H. W. Kenway.*
ATTORNEY

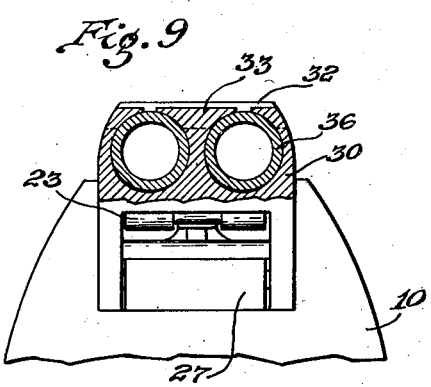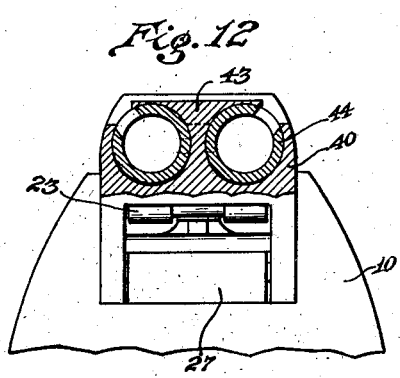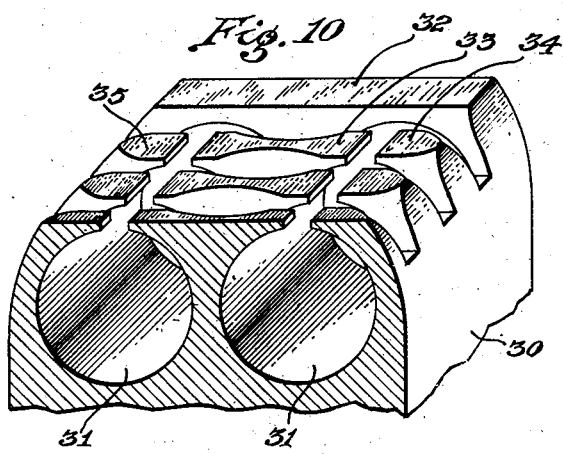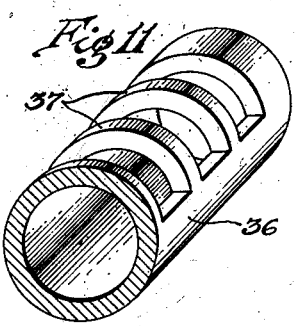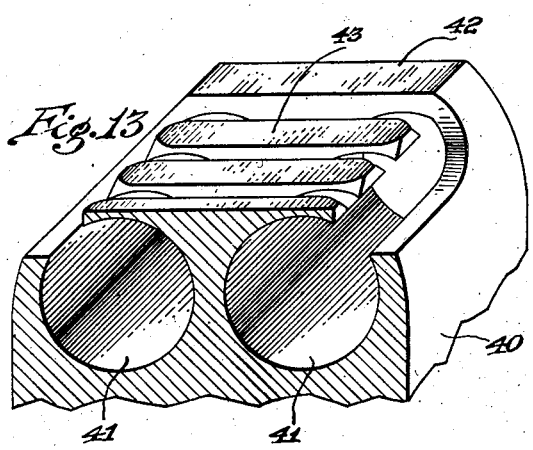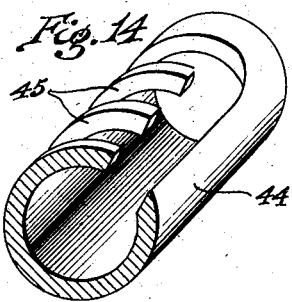

Patented Aug. 26, 1941

2,253,737

UNITED STATES PATENT OFFICE 2,253,737

SHAVING IMPLEMENT

Nicholas Testi, Boston, Mass., assignor to Gillette Safety Razor Company, Boston, Mass., a corporation of Delaware Application August 23, 1937, Serial No. 160,363

14 Claims. (Cl. 30—43)

This invention relates to dry shaving implements of the type employing relatively movable shearing members. In one aspect the invention consists in an implement organized and constructed to shear with the same precision at both sides, or at both ends of a series of transverse shearing teeth.

The best results are secured by constructing dry shaving implements as instruments of precision with closely fitting parts and limited clearances. I have discovered that a particularly uniform and desirable shearing action may be secured by providing a plurality of elongated movable shearing members which are located side-by-side in the implement and pressed in an equalizing manner against the stationary shearing teeth. By arranging each of a plurality of cutters to be pressed into shearing engagement regardless of the position of the other cutter, it has been found practical to bring about more perfect shearing action at the two sides of the implement than by attempting to fit a single cutter throughout a wide shearing zone which may be angular in contour or otherwise require special fitting of the cutter co-operating therewith.

One desirable construction for maintaining the shearing engagement of a plurality of elongated cutters as herein shown consists in rollers located beneath the opposite ends of the cutters and arranged to press the cutters in an equalizing manner, or each independently of the position of the other, against the respective portion of the stationary shearing teeth with which that cutter co-operates. While I have herein shown roller pressing means as applied to a pair of co-operating cutters it will be understood that the construction may be utilized with advantage in connection with an implement having a single cutter.

Another feature of the invention consists in improved retaining means arranged to hold the head of the implement upon its seat in operative position or, if desired, to hold the head in an outwardly projected position in which access may be conveniently had to the cutters or to the internal mechanism of the implement. For example, an operating lever may be mounted in the housing of the implement and maintained in operative engagement with the cutter when the head of the implement occupies a position upon its seat, whereas the operating lever may be disengaged from the cutter when the head is held in its outwardly extended position and thus the cutter may be freed for removal from the head for purposes of replacement or cleaning.

Another feature of the invention consists in the provision of means whereby the path of the movable cutter may be adjusted with respect to the stationary shear member, or the relation of the stationary shearing teeth and the movable shearing teeth may be adjusted and regulated. By such adjustment also the shearing openings of the teeth may be regulated. As herein shown, the position and path of the reciprocatory cutters are controlled by the operating lever of the implement and threaded adjusting means are provided for shifting the outer member of the head longitudinally independently of the cutters to regulate the open time of the cycle of the implement.

Still another feature of the invention resides in a head having shearing teeth of arcuate contour in which the shearing edge is maintained intact throughout the thinner section of the tooth and hair passages are provided only in offset location where the section is thicker. This not only facilitates close shaving of the implement but obviates thin sharp tooth ends which are likely to scratch the user.

These and other features of the invention will be best understood and appreciated from the following description of a preferred embodiment thereof, selected for purposes of illustration and shown in the accompanying drawings, in which:

Fig. 1 is a view of the implement in side elevation, the housing being shown as broken away;

Fig. 2 is a view in longitudinal section and on an enlarged scale;

Fig. 3 is a view in end elevation, partly in cross-section, on the same scale as Fig. 2;

Fig. 4 is a view in perspective, partly in cross-section of the stationary shear member;

Fig. 5 is a view in cross-section, partly in plan, showing the cutters;

Fig. 6 is a view in front elevation on the same scale as Fig. 1;

Fig. 7 is a cross-section detail of the cutters and associated parts;

Fig. 8 is a fragmentary detail of the retaining device;

Fig. 9 is a view in end elevation, partly in section, of an implement of modified construction;

Figs. 10 and 11 are views in perspective of the stationary shear member and one of the cutters shown in Fig. 9;

Fig. 12 is a view in side elevation, partly in section, of an implement of still another modified construction;

Figs. 13 and 14 are views in perspective of the stationary shear member and one of the cutters shown in Fig. 12.

The implement illustrated in Figs. 1 to 8 will first be described as a preferred embodiment of the invention. It includes in its structure a casing 10 of "Bakelite" or other material moulded to serve as a handle for the implement and also as a housing for a small motor and operating connections. The motor is not shown in the present drawings. A vibrating lever 12 which is actuated thereby is shown as mounted within the housing upon a transverse journal 11 and as projecting outwardly through an opening in the end of the housing.

The housing 10 is shaped externally at its end to provide a pair of spaced ribs forming a socket for the metal head of the implement. This comprises an elongated block 16 having downwardly extending flanges at its lower edges, a pair of longitudinal bores 17 and 18 and transverse shearing teeth 19 in its upper surface. The shearing teeth are formed by a series of transverse grooves which break through into the top of the bores 17 and 18 and the teeth are rounded and tapered at their outer ends to facilitate the passages of hair between them. The lower arcuate edges of the teeth 19 constitute the stationary shearing edges of the implement. The teeth are separated into two longitudinal series by a centrally disposed groove removing a portion of the partition between the two bores 17 and 18 and breaking through into the bores 17 and 18 in offset relation, that is to say, offset with respect to vertical planes through the axes of the cutters. Accordingly, it will be seen that the shearing edge of each tooth is maintained intact throughout the zone of its thinnest section, that is, the section immediately above the body of the bore. This thin section reduces to a minimum the length of the stubble left in shaving by the implement. It also insures a substantial thickness at the inner end of each tooth section and so eliminates danger of scratching. The bores 17 and 18 are, therefore, separated by a common wall which terminates below the top of the bores. A guard flange or bridge 20 extends across each end of the member 16 being higher and thicker than the teeth 19 and acting to protect and safeguard them from injury in the use of the implement.

Cylindrical cutters 21 and 22 are arranged to reciprocate within the two bores 17 and 18 and in these cutters are formed the movable shearing teeth of the implement. To this end each of the cutters is transversely slotted to provide a series of shearing teeth in its upper section. As herein shown the bottom of each series of shearing teeth lies in a downwardly and outwardly inclined plane so that the teeth are deeper at the outer edges of the implement than they are adjacent to the partition which separates the cutters. The cutters are recessed in adjacent faces to provide a composite recess of square outline adapted to receive the squared end of the operating lever 12 as shown in Figs. 5 and 7. By this connection the two cutters are vibrated simultaneously beneath the stationary teeth 19. The two cutters are pressed upwardly in an equalizing manner and maintained in yielding engagement with the stationary shear teeth of the implement by a leaf spring 25 acting through a pair of rollers 23 and 24, one pair being located under each end of the cutters. The rollers 23 and 24 are both shouldered and provided with a reduced intermediate portion which fits over the spring 25 and thus are the rollers maintained in position against transverse displacement. Further, each of the rollers is disposed within a transverse bore in the head 16 which allows it to roll slightly back and forth but limits it in such movement to a restricted path beneath one end of the cutter.

The leaf-spring 25 is supported and maintained under tension by the engagement with the upper limb of a stirrup-shaped retaining member 27. The spring 25 is centrally recessed to receive an upstanding flange struck out from the member 27 and surrounding an aperture through which passes the vibrating lever 12. The flat upper limb of the member 27 is received in a pair of forked studs 26 which extend across the head 16 between its flanges.

The down-turned legs of the retaining member 27 are each provided with a rounded projection and these are shaped to interlock with inwardly projecting shoulders 14 formed in the housing 10 and so located as to maintain the head upon its seat when in the position shown in Fig. 2. The retaining member 27 is of resilient character and its ends engage inclined walls of the shoulders 14 so that the head is always urged inwardly and held secure upon its seat. Each leg of the retaining member 27 passes out through an opening 13 in the end of the housing and these openings define a second pair of shoulders with which the rounded ends of the retaining member are arranged to interlock when once forced beyond the shoulders 14. The retaining member 27 is therefore adapted to hold the head 16 either in an inner operative position, wherein the operating lever 12 engages the cutter, or in an outer position as indicated in Fig. 6, wherein the cutters have been moved beyond the end of the operating lever 12 and disengaged therefrom so that both cutters are free to be detached by being pushed endwise out of their respective bores as suggested in Fig. 6. If it is desired entirely to remove the head 16 from the housing 10 the legs of the retaining member may be deflected inwardly sufficiently to disengage the outer shoulders and pass completely through the openings 13.

Since the path of movement of the lever 12 and the cutters is fixed by the operating train it is important to adjust the head 16 longitudinally to secure the proper relation of the stationary shear teeth 19 to the movable shear teeth of the cutters and to insure reversal of the cutter movement at the instant when the cutter teeth register below the outer stationary teeth. To this end the housing 10 is provided with an open-end slot of just sufficient width to receive the eccentric head of an adjusting screw 15 which is threaded in one side of the head 16. By turning the screw 15 in one direction or the other the head 16 may be bodily shifted in either direction and the position of the head 16 thus adjusted with respect to the cutters. More specifically, the adjusting movement of the head 16 by the screw 15 adjusts the shearing teeth 19 with reference to the shearing teeth of the cutters 21 and 22.

The modified implement illustrated in Figs. 9, 10 and 11 is similar in most respects to that already described. In this instance, however, a stationary outer member 30 is provided with two separate longitudinal slots entering the bores 31 vertically above their axes and thus dividing the shearing teeth into central sections 33 and outer sections 34 and 35. The cutter 36 in this instance is tubular in form instead of solid and is provided with a series of segmental shearing teeth 37. In Fig. 10 the rear portion of the outer member 30 is shown, this includes the bridge or guard 32.

In the modified implement shown in Figs. 12, 13 and 14, two longitudinal grooves are provided in the outer member 40 which break through into the upper and outer portion of the bores 41. A centrally disposed series of shearing teeth 43 is thus provided and these are supported by the central partition portion of the member 40 and overhang at their outer ends. The bridge member 42 is shown at the rear end of the implement in position to safeguard the more fragile teeth 43. The cutter 44 employed in this implement is tubular in shape and provided with a series of shearing teeth 45 which are terminated at one end by a longitudinal slot.

Having thus described my invention what I claim as new and desire to secure by Letters Patent of the United States is:

1. A dry shaving implement having a stationary member with parallel longitudinal bores, an intermediate wall into which both bores open, and transverse shearing teeth opening into one side of said bores, reciprocatory cutters in said bores, and means for pressing the cutters toward the openings of the shearing teeth.

2. A dry shaving implement having a member with transverse shearing teeth divided by a longitudinal slot, separate reciprocatory cutters mounted in cylindrical bores beneath said teeth, one being located at each side of the slot, and means common to both cutters for pressing the cutters toward said teeth with an equalizing pressure.

3. A dry shaving implement having a member with transverse shearing teeth, a pair of reciprocatory cutters arranged side-by-side beneath said teeth, said member having retaining pockets beneath both ends of said cutters, rollers located in said pockets, and spring means for forcing said rolls against said cutters in a pressure-equalizing manner.

4. A dry shaving implement comprising a member transversely slotted to present shearing teeth, reciprocatory cylindrical cutters arranged side-by-side in spaced bores beneath said teeth and within said member, rollers mounted for limited movement beneath both ends of said cutters, and spring means for pressing each of said rollers in a pressure-equalizing manner against both of said cutters.

5. A dry shaving implement comprising a head with transverse shearing teeth and a longitudinal bore therein, a cutter arranged to reciprocate in the bore, a handle having a socket for the head and an operating lever for the cutter, and retaining means including spaced shoulders for holding the head in either of two definite positions, one in which the cutter is engaged by the operating lever in the handle and one in which the cutter clears said lever.

6. A dry shaving implement having a housing with a socket, a head fitting the socket and carrying a reciprocatory cutter, means for longitudinally adjusting the head in said socket, and elongated retaining means adjustably related to the head and interlocking with the housing in different positions of engagement whereby the head may be held in an inner operative position or in an outer inoperative position regardless of its longitudinal adjustment.

7. A dry shaving implement having a housing with a seat, a head having a reciprocatory cutter therein, an operating lever projecting from the housing into driving engagement with the cutter, and a resilient retaining stirrup slidingly engaged by the head and having legs projecting into the housing for interlocking engagement therewith in either of two positions, whereby the head may be held upon its seat or in an extended position spaced from the seat and disengaged from said lever.

8. A dry shaving implement having a head with fixed shearing teeth and a guideway beneath them, an elongated cutter mounted to reciprocate in said guideway, a retaining member arched beneath the head and having a flanged aperture, a spring engaging the flange of the aperture and acting upon both ends of the cutter, and an operating lever for the cutter passing through the aperture of said retaining member.

9. A dry shaving implement having an elongated outer member with parallel longitudinal bores therein and transverse slots in the walls of said bores forming stationary shearing teeth, a cylindrical cutter movable in each bore, and means common to both cutters for pressing the cutters in an equalizing manner toward the stationary teeth.

10. A dry shaving implement having a handle portion and a detachable head containing a reciprocatory cutter, the head and cutter having co-operating shearing teeth, means for detachably holding the head in the handle, and means for positively and longitudinally moving the head with respect to the cutter to regulate the shearing openings of the implement at the point of reversal of the cutter movement.

11. A dry shaving implement having a body with bores located side-by-side and opening into each other, shearing teeth above the bores terminating in a slot common to both bores, a separate elongated cutter in each bore, and means for actuating the cutters in unison.

12. A dry shaving implement comprising a casing serving as a combined housing and handle for the implement, an operating lever mounted in the casing, a toothed head carrying a reciprocatory toothed cutter actuated by said lever, means for detachably holding the head in the casing, and separate means for longitudinally moving the head in the casing with reference to the path of said operating lever and cutter to insure reversal of the cutter movement when the cutter teeth register below the teeth of the head.

13. A dry shaving implement having a cutter head comprising a body having in its outer side two spaced rows of stationary teeth facing in opposite directions with their free ends away from each other, a hollow movable inner cutter having a separate set of cutter teeth co-operating with each row of stationary teeth, the two sets of stationary cutter teeth being spaced from each other with the free ends of the teeth in each set directed away from the other set, the free ends of the outer stationary teeth projecting beyond the free ends of the inner movable cutter teeth and extending outward so as to overlap a portion of the free ends of these inner teeth, and means for reciprocating the inner cutters to carry their teeth in a direction transversely of the stationary teeth and co-operating therewith for cutting hair.

14. In a dry shaving implement, a cutter head comprising a body having parallel longitudinal bores therein, a common wall separating the bores and terminating below the top of the bores, said body being transversely slotted to provide shearing teeth above each bore, and a cylindrical cutter movable in each bore.

NICHOLAS TESTI.